(12) United States Patent
Baghdassarian (10) Patent No.: US 9,171,329 B2
(45) Date of Patent: Oct. 27, 2015

(54) VEHICLE IMPOUND AND AUCTIONING MANAGEMENT SYSTEM

(75) Inventor: Levon Baghdassarian, Holmdel, NJ (US)

(73) Assignee: NOBEL COMPUTER SYSTEMS, INC., Holmdel, NJ (US)

( * ) Notice: Subject to any disclaimer, the term of this patent is extended or adjusted under 35 U.S.C. 154(b) by 158 days.

(21) Appl. No.: 13/212,961

(22) Filed: Aug. 18, 2011

(65) Prior Publication Data

US 2012/0072256 A1    Mar. 22, 2012

Related U.S. Application Data

(63) Continuation of application No. 12/610,260, filed on Oct. 30, 2009, now abandoned.

(51) Int. Cl.
| | |
|---|---|
| *G06Q 40/00* | (2012.01) |
| *G06Q 30/00* | (2012.01) |
| *G07B 17/00* | (2006.01) |
| *G06Q 30/08* | (2012.01) |
| *G06Q 10/06* | (2012.01) |

(52) U.S. Cl.
CPC .......... *G06Q 30/08* (2013.01); *G06Q 10/06314* (2013.01); *G06Q 40/12* (2013.12)

(58) Field of Classification Search
USPC ........................................................ 705/30
See application file for complete search history.

(56) References Cited

U.S. PATENT DOCUMENTS

| | | | |
|---|---|---|---|
| 7,349,870 B1 | 3/2008 | Mahoney et al. | |
| 7,720,722 B2 * | 5/2010 | Ho et al. ...................... | 705/26.8 |
| 8,442,884 B2 * | 5/2013 | Haberstroh .................... | 705/35 |
| 2004/0107160 A1 | 6/2004 | Goclowski | |
| 2004/0128224 A1 | 7/2004 | Dabney et al. | |
| 2005/0228736 A1 | 10/2005 | Norman et al. | |
| 2007/0143201 A1 * | 6/2007 | Swanson et al. ................ | 705/37 |
| 2007/0244797 A1 | 10/2007 | Hinson | |
| 2008/0222115 A1 | 9/2008 | Bonds | |
| 2008/0228512 A1 | 9/2008 | Calkins et al. | |
| 2008/0255887 A1 * | 10/2008 | Gruter .............................. | 705/4 |

OTHER PUBLICATIONS

International Search Report in PCT/US2010/054993, Nobel Computer Systems, Inc., Applicant, mailed Jan. 6, 2011, 3 pages.

* cited by examiner

*Primary Examiner* — Ariel Yu (57) ABSTRACT

A system is employed to operate a vehicle impounding facility for a municipality. A selection is received of a marked vehicle in a marked grid for titling, and an application for title for the selected vehicle is effectuated in the name of the municipality. A notation is received of a selected vehicle in a pending grid as being titled when the application for title for the selected vehicle has been approved and received. A scheduling is received of a titled vehicle in a select auction date grid for an upcoming auction. An assignment is received of a minimum bid value to a scheduled vehicle in a minimum bid guide grid in connection with the auction. Entry is received in a final auction grid of a purchase price for which a valued vehicle has been auctioned and a purchaser.

22 Claims, 9 Drawing Sheets

VEHICLE IMPOUND AND AUCTIONING MANAGEMENT SYSTEM

CROSS-REFERENCE TO RELATED APPLICATIONS

This patent application is a continuation of U.S. patent application Ser. No. 12/610,260 filed Oct. 30, 2009, and claims priority thereto under 35 U.S.C. §120, the entire disclosure of which is incorporated herein by reference.

COPYRIGHT OR MASK WORK NOTICE

A portion of the disclosure of this patent document may contain material which is subject to copyright or mask work rights protection. The copyright or mask work rights owner has no objection to the facsimile reproduction by anyone of the patent document or the patent disclosure as it appears in the Patent and Trademark Office patent file or records but otherwise reserves all copyright or mask work rights whatsoever.

BACKGROUND OF THE INVENTION

1. Field of the Invention

The present disclosure relates to a system for managing an vehicle impounding facility, such as for example may be operated by or on behalf of a municipality. More particularly, the present disclosure relates to such a system that manages auctioning particular ones of the vehicles in the facility upon the occurrence of appropriate circumstances.

2. Description of Related Art

Many municipalities, other governmental agencies, and the like operate vehicle impounding facilities or the like, or have such facilities operated on their behalf, as may be appreciated. Typically, although by no means necessarily, a facility or the like (hereinafter, 'facility') is employed by a municipality or the like (hereinafter, 'municipality') to hold and/or store automobiles, trucks, and other vehicles (hereinafter, 'vehicles') that have been taken into custody by the municipality, for any of a variety of reasons. The reasons for such custody of such a vehicle may include but are not limited to: un-paid parking or moving violations associated with the vehicle, the vehicle has been employed in the commission of a crime, the vehicle has been involved in a traffic accident, the vehicle has been abandoned, the vehicle has been improperly left in a restricted area, the vehicle has been moved during an emergency, and the like.

In any case, once such a vehicle is in the custody of the municipality, such municipality is typically required to take a certain amount of care with respect to the vehicle, including being able to locate the vehicle and taking reasonable steps to protect the vehicle. Accordingly, the municipality operates as the facilities one or more impound lots or the like within which the vehicle is stored or 'impounded'. Typically, although not necessarily, the vehicle remains impounded until the municipality no longer requires possession of the vehicle. Thus, it may be that the vehicle is eventually released to an owner thereof or the like (hereinafter 'owner'), perhaps upon payment of appropriate fines, penalties, storage costs, and/or the like, and upon the owner establishing a claim to the vehicle.

Notably, though, it may be that the owner of the vehicle never claims the impounded vehicle and/or never makes payment for the impounded vehicle, among other things. In such a case, the municipality eventually begins a process where the non-claimed and still impounded vehicle is auctioned. In doing so, the municipality can be removed from the possession of and responsibility for the non-claimed vehicle, and also can re-coup at least some of the costs associated with impounding the vehicle, among other things.

As may be appreciated, the municipality cannot merely auction the non-claimed vehicle at will. Instead, the municipality typically follows a process both to give the owner of the vehicle a reasonable amount of time to claim the vehicle, and to establish the right to auction the vehicle, perhaps as shown by an appropriate title document for the vehicle. Accordingly, the auction process does not begin until a reasonable amount of time after the vehicle has been impounded, perhaps 21 or 30 days. Likewise, it may be that the municipality must perform reasonable attempts to locate and inform the owner regarding the non-claimed vehicle. Also, it may be that the municipality must apply for and receive the aforementioned title document for the vehicle.

As may be appreciated, such an overall impounding and auctioning enterprise can quickly become highly complicated and confusing, particularly as the number of impounded vehicles increases and as the auctioning process becomes detailed. Accordingly, a need exists for a computerized vehicle impound system designed to effectively manage vehicle impoundment for a municipality, and to eliminate problems and confusion associated with vehicle impound management. Notably, a need exists for such a vehicle impound system that can track and control each impounded vehicle in the possession of a municipality, from impoundment until disposition, be it by way of reclamation, auctioning, or the like. Likewise, a need exists for such a vehicle impound system that guides each non-claimed vehicle through the auction process. Moreover, a need exists for such a vehicle impound system that provides information on each impounded vehicle to qualified individuals.

BRIEF SUMMARY OF THE INVENTION

The aforementioned needs are satisfied by a system and method performed by a computer hardware system employed to operate a vehicle impounding facility operated on or behalf of a municipality, where the facility holds vehicles impounded by or on behalf of the municipality. Each of several marked impounded vehicles are displayed to a system user in a marked grid, a selection is received of a marked vehicle in the marked grid for titling, and upon receiving the selection of the marked vehicle an application for title for the selected vehicle is effectuated in the name of the municipality. Each selected vehicle is displayed to a system user in a pending grid, and a notation is received of a selected vehicle in the pending grid as being titled when the application for title for the selected vehicle has been approved and received.

Each titled vehicle is displayed to a system user in a select auction date grid, and a scheduling is received of a titled vehicle in the select auction date grid for an upcoming scheduled auction date. Each scheduled vehicle is displayed to a system user in a minimum bid guide grid, along with estimated vehicle values for the scheduled vehicle as obtained from a vehicle valuation service based on information available from the record for the scheduled vehicle, and an assignment is received of a minimum bid value to a scheduled vehicle in the minimum bid guide grid in connection with the auction thereof. Each valued vehicle is displayed to a system user in a final auction grid, and entry is received of a purchase price for which a valued vehicle in the final auction grid has been auctioned and a purchaser to whom the valued vehicle in the final auction grid has been auctioned.

In one embodiment herein, a computer hardware system is disclosed that is instantiated on computer hardware including a processor and memory, the system for being employed to operate a vehicle impounding facility operated on or behalf of a municipality, the facility for holding vehicles impounded by or on behalf of the municipality, the system comprising modules instantiated in the memory by the processor. The modules comprise: a marked grid module that displays each of several marked impounded vehicles to a system user in a marked grid, the marked grid module allowing a system user to select a marked vehicle for titling and upon receiving a selection of a marked vehicle effectuating an application for title for the selected vehicle in the name of the municipality; a pending grid module that displays each selected vehicle to a system user in a pending grid, the pending grid module allowing a system user to note a selected vehicle as being titled when the application for title for the selected vehicle has been approved and received; a select auction date grid module that displays each titled vehicle to a system user in a select auction date grid, the select auction date grid module allowing a system user to schedule an upcoming scheduled auction date for a titled vehicle; a minimum bid guide grid module that displays each scheduled vehicle to a system user in a minimum bid guide grid, along with estimated vehicle values for the scheduled vehicle as obtained by the minimum bid guide grid module from a vehicle valuation service based on information available from the record for the scheduled vehicle, the minimum bid guide grid module allowing a system user to assign a minimum bid value to a scheduled vehicle in connection with the auction thereof; and a final auction grid module that displays each valued vehicle to a system user in a final auction grid, the final auction grid module allowing a system user to enter a purchase price for which the valued vehicle has been auctioned and a purchaser to whom the valued vehicle has been auctioned.

The system may have a marking module that marks each impounded vehicle after a period of time after impoundment of the vehicle has elapsed as a marked vehicle available for auctioning. Each vehicle may be represented as a record in a system database, the record for the vehicle including all pertinent information relating thereto and being updated by the modules, the record being created by electronically scanning a vehicle identification number (VIN) located on the vehicle and employing the scanned VIN to obtain corresponding vehicle identification data from a VIN database. When the system has a marked grid module, the module, upon receiving a selection of a marked vehicle may automatically create a title application form based on information available from the record for the selected vehicle. The marked grid module, upon receiving a selection of a marked vehicle, may also automatically move the selected vehicle from the marked grid to the pending grid.

The pending grid module may, upon being informed that a pending vehicle has been titled, automatically move the titled vehicle from the pending grid to the select auction date grid. The select auction date grid module may, upon being informed that a titled vehicle has been scheduled for an auction date, automatically move the scheduled vehicle from the select auction date grid to the minimum bid guide grid.

The estimated vehicle values may include at least one of a retail value, clean, average, and rough trade-in values, and a loan value such as would be used when employing the scheduled vehicle as collateral. The minimum bid guide grid module may pre-populate the minimum bid value for the scheduled vehicle based on the obtained estimated vehicle values. The minimum bid guide grid module may, upon being informed that a scheduled vehicle has been assigned a minimum bid value, automatically move the valued vehicle from the minimum bid guide grid to the final auction grid.

Another embodiment of the invention includes a method performed by a computer hardware system instantiated on computer hardware including a processor and memory, the system for being employed to operate a vehicle impounding facility operated on or behalf of a municipality, the facility for holding vehicles impounded by or on behalf of the municipality. The method comprises: displaying each of several marked impounded vehicles to a system user in a marked grid, receiving a selection of a marked vehicle in the marked grid for titling, and upon receiving the selection of the marked vehicle effectuating an application for title for the selected vehicle in the name of the municipality; displaying each selected vehicle to a system user in a pending grid, and receiving a notation of a selected vehicle in the pending grid as being titled when the application for title for the selected vehicle has been approved and received; displaying each titled vehicle to a system user in a select auction date grid, and receiving a scheduling of a titled vehicle in the select auction date grid for an upcoming scheduled auction date; displaying each scheduled vehicle to a system user in a minimum bid guide grid, along with estimated vehicle values for the scheduled vehicle as obtained from a vehicle valuation service based on information available from the record for the scheduled vehicle, and receiving an assignment of a minimum bid value to a scheduled vehicle in the minimum bid guide grid in connection with the auction thereof; and displaying each valued vehicle to a system user in a final auction grid, and receiving entry of a purchase price for which a valued vehicle in the final auction grid has been auctioned and a purchaser to whom the valued vehicle in the final auction grid has been auctioned.

The method may further comprise marking each impounded vehicle after a period of time after impoundment of the vehicle has elapsed as a marked vehicle available for auctioning.

Each vehicle may be represented in the method as a record in a system database, the record for the vehicle including all pertinent information relating thereto, and the method may further comprise creating the record by electronically scanning a vehicle identification number (VIN) located on the vehicle and employing the scanned VIN to obtain corresponding vehicle identification data from a VIN database.

The method may further comprise, upon receiving a selection of a marked vehicle, automatically creating a title application form based on information available from the record for the selected vehicle. Upon receiving a selection of a marked vehicle, the method may also include automatically moving the selected vehicle from the marked grid to the pending grid. Also, upon being informed that a pending vehicle has been titled, the method may include automatically moving the titled vehicle from the pending grid to the select auction date grid. Further, upon being informed that a titled vehicle has been scheduled for an auction date, the method may include automatically moving the scheduled vehicle from the select auction date grid to the minimum bid guide grid.

The estimated vehicle values in the method may include at least one of a retail value, clean, average, and rough trade-in values, and a loan value such as would be used when employing the scheduled vehicle as collateral.

The method may further comprise pre-populating the minimum bid value for the scheduled vehicle based on the obtained estimated vehicle values. Upon being informed that a scheduled vehicle has been assigned a minimum bid value, the method may include automatically moving the valued vehicle from the minimum bid guide grid to the final auction grid.

BRIEF DESCRIPTION OF THE SEVERAL VIEWS OF THE DRAWING(S)

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF THE INVENTION

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

Figure 1:
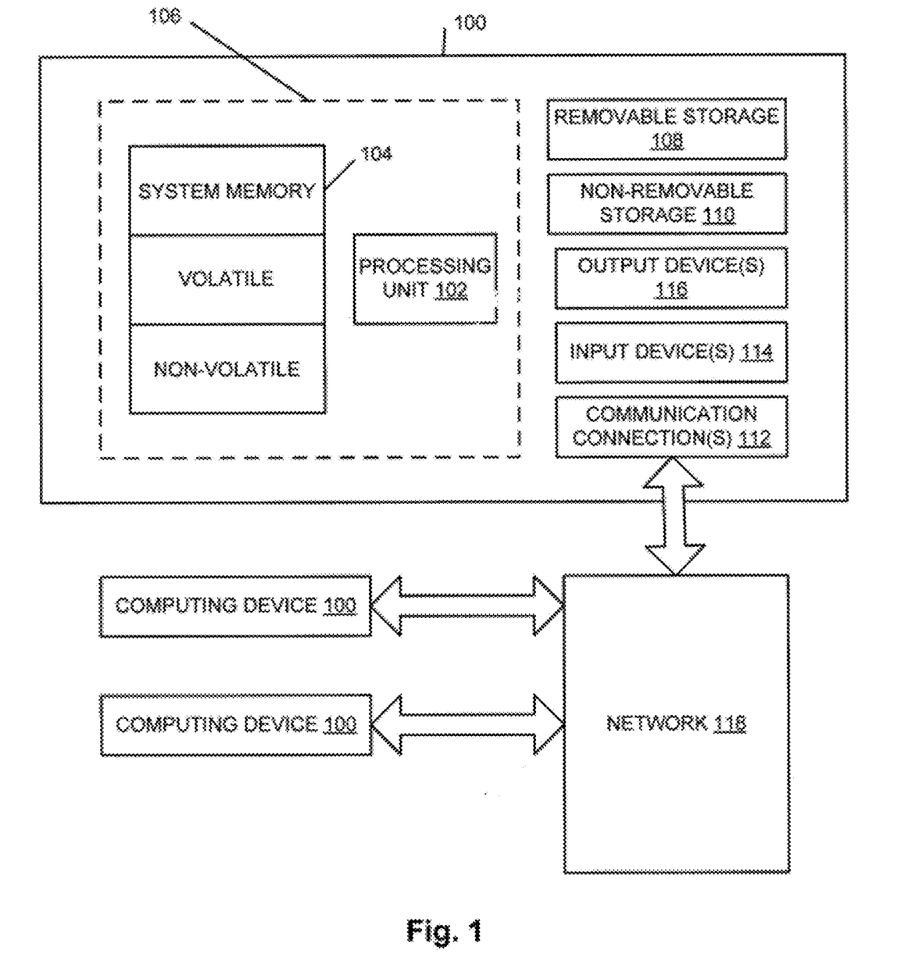
FIG. 1 is a block diagram of an example of a computing environment within which various embodiments of the present innovation may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Vehicle Impounding and Auctioning

Figure 2:
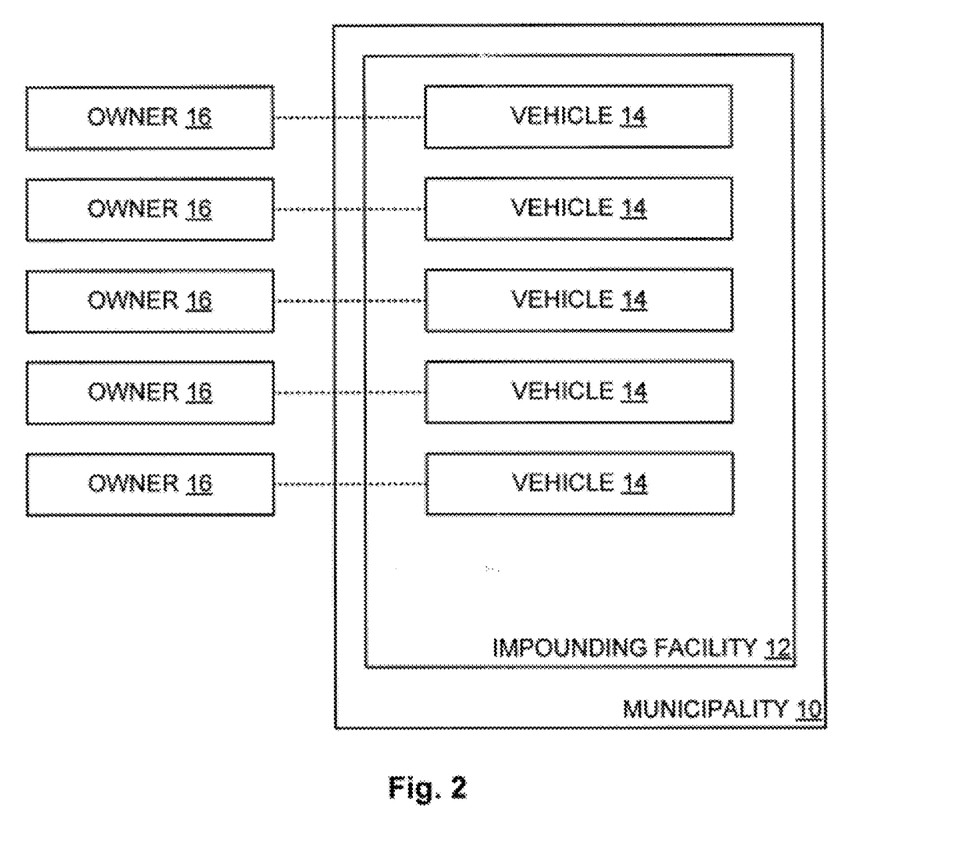
FIG. 2 is a block diagram of a vehicle impound facility as operated by a municipality.

Turning now to FIG. 2, it is seen that a municipality, other governmental agency, or the like ('municipality 10') operates a vehicle impounding facility or the like ('facility 12'), or has such facility 12 operated on its behalf, as the case may be. As was set forth above, the facility 12 holds and/or stores automobiles, trucks, and other vehicles ('vehicles 14') that have been taken into possession or custody by the municipality 10. Typically, such possession or custody can arise with respect to a vehicle 14 based on un-paid parking and/or moving violations associated with the vehicle 14, the vehicle 14 has been employed in the commission of a crime, the vehicle 14 has been involved in a traffic accident, the vehicle 14 has been abandoned, the vehicle 14 has been improperly left in a restricted area, the vehicle 14 has been moved during an emergency, or the like.

While in such possession, the municipality 10 typically is required to take a certain amount of care with respect to the vehicle 14, including being able to locate the vehicle 14 and taking reasonable steps to protect the vehicle 14. Accordingly, the municipality may operate one or more impound lots or the like as the facilities 12, where the possessed vehicle 14 is stored or 'impounded' in one of such facilities 12. Typically, although not necessarily, the vehicle 14 remains impounded in the facility 14 until the municipality 10 no longer requires possession of the vehicle 14. Thus, it may be that the vehicle 14 is eventually released to an owner thereof or the like ('owner 16'), perhaps upon payment of appropriate fines, penalties, storage costs, and/or the like, and upon the owner 16 establishing a claim to the vehicle 14.

It may be the case that the owner 16 of the impounded vehicle 14 never claims same and/or never makes payment for same. That is to say, the owner 16 may decide it is not worthwhile to recover the vehicle 14 from the facility 12, may decide not to pay the fines, penalties, fees, and other costs associated with same, may never become aware that the vehicle 14 has been impounded, or the like. Oftentimes, the costs associated with recovering the vehicle are relatively high, especially if the vehicle has been impounded over an extended period of time and the municipality 10 charges a daily impound fee or the like, and the relatively high cost exceeds the value of the vehicle as perceived by the owner 16, in which case the owner 16 may decide to abandon the vehicle 14 to the municipality. In other circumstances, it may be that the vehicle 14 has been seized in connection with criminal activity and the owner 16 has been required to forfeit the vehicle 14 to the municipality 10, among other things.

As was set forth above, if the owner 16 of the impounded vehicle 14 never claims same and/or never makes payment for same, the municipality eventually begins a process 18 (FIG. 3) where the non-claimed and still impounded vehicle 14 is auctioned. As such, the municipality 10 can be removed from the possession of and responsibility for the non-claimed vehicle 14, and also can re-coup at least some of the costs associated with impounding the vehicle 14, among other things.

Figure 3:
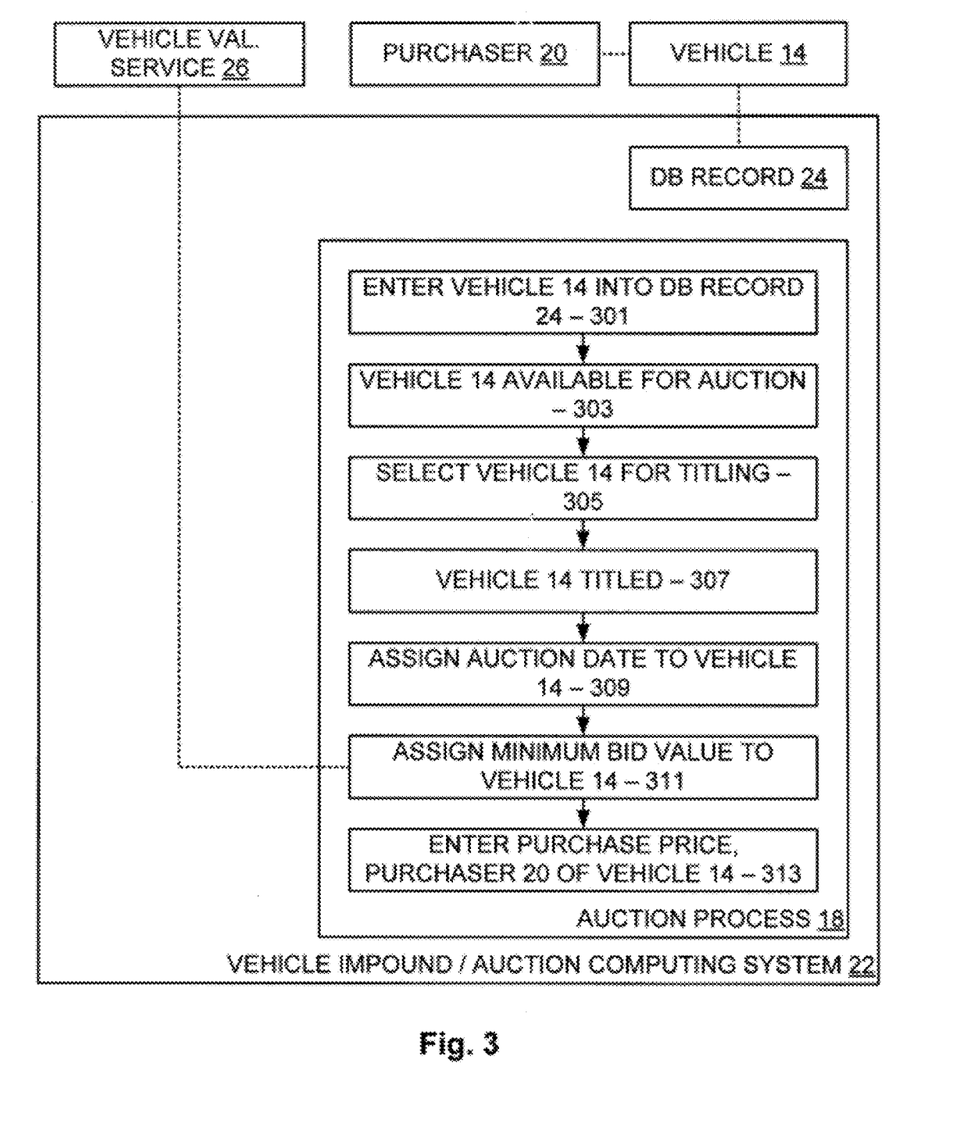
FIG. 3 is a block diagram of a vehicle impound and auction computer system to be employed in connection with vehicles in the facility of FIG. 2 in accordance with various embodiments of the present innovation.

The auctioning process 18 may vary according to each municipality 10, but typically includes selecting a vehicle 10 to be auctioned, obtaining title or other proof of ownership for the selected vehicle 10, setting an auction date for the selected vehicle 10, establishing a minimum bid for the selected vehicle 10, advertising the selected vehicle 10 as being available at auction, auctioning the selected vehicle 10, and transferring title of the auctioned vehicle 10 to a purchaser 18 thereof at the auction, among other things.

Vehicle Impound and Auctioning System

As was set forth above, an overall impounding and auctioning enterprise can quickly become highly complicated and confusing, particularly as the number of impounded vehicles 14 increases and as the auctioning process 18 becomes detailed. Accordingly, in various embodiments of the present innovation, and turning now to FIG. 3, a system 22 is provided to allow the municipality 10 or the like to manage the impounding and auctioning of vehicles 14. As should be appreciated, such a system 22 is a computer system with hardware and software elements organized, programmed, and/or otherwise configured to perform the functionality set forth herein. Thus, the system 22 employs computers 100 such as that of FIG. 1, including computers 100 configured as or including databases, servers, and other appropriate computing elements, all organized according to an appropriate computer architecture. As shown in FIG. 3, the process 18 is represented by a number of modules 301 et seq., each of which is instantiated to perform a particular function in the system 22.

The system 22 may be locally or remotely situated with respect to the municipality 10 and/or the facility 12. In the latter case, an interconnected network of computers such as the Internet may be appropriately employed to access and employ the system 22. Also in the latter case, a plurality of municipalities 10 may share the system 22 or subscribe to the system 22, in which case each of the plurality of municipalities 10 would be provided with a separate account or the like, and the data thereof would be segregated from other municipalities 10.

Generally, in the system 22 and with regard to a particular municipality 10, each vehicle 14 impounded by such municipality 10 has a corresponding database record 24, where the record 24 for the vehicle 14 includes all pertinent information relating thereto and is periodically updated as necessary to reflect changes and/or new information. Such a database record 24 may take any appropriate form and be in any appropriate database without departing from the spirit and scope of the present innovation.

Figure 4:
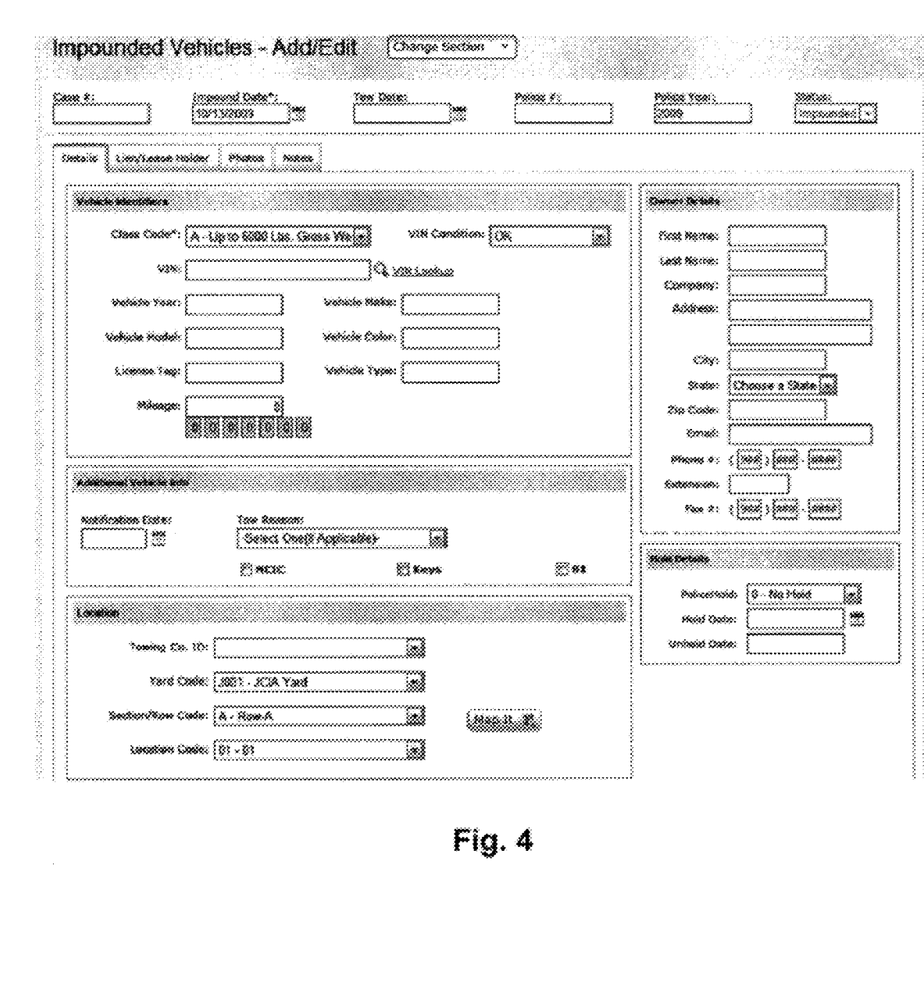
FIGS. 4-9 depict screen shots from the system of FIG. 3 as may be viewed by an operator or the like thereof, both to document an impounded vehicle (FIG. 4) and to auction the impounded vehicle (FIGS. 5-9), all in accordance with various embodiments of the present invention.

As seen in FIG. 3 the system 22 is generally initiated with respect to each of one or more impounded vehicles 14 by entering information pertaining thereto into a corresponding database record 24 (301). As seen in FIG. 4, the database record 24 for a particular impounded vehicle 14 may include information including a case number, an impound date, a tow date, data identifying the vehicle 14, data identifying the facility 12 where the vehicle 14 is located, and data identifying the owner, among other things. Additionally, the record 24 may include data identifying a known lien or lease holder for the vehicle 14, photos of the vehicle, and notes relating to the vehicle 14. As may be appreciated, such photos in particular may be employed to document the condition of the vehicle 14, including pre-existing damage thereto.

Also, the record 24 may be updated at an appropriate time to reflect that the vehicle has been released to the owner 16 thereof, in which case the record includes information pertaining to the release, and/or that the vehicle has been surrendered by the owner 16 thereof, in which case the record includes information pertaining to the surrender. With regard to releasing the vehicle 14, it is to be appreciated that such release likely includes payment of fines, penalties, and/or other costs which are noted to the record 24. With regard to surrendering the vehicle 14, it is to be appreciated that such surrender in effect transfers title of the vehicle 14 to the municipality 10 in lieu of some or all of the aforementioned fines, penalties, and/or other costs.

As should be understood, in the normal course of operation, a record 24 is created for a vehicle 14 by or on behalf of the municipality 10 upon impoundment thereof and storage in a facility 12. In doing so, at least some of the information in the record 24 may be entered manually by an operator and/or automatically by way of an appropriate scanning device and/or automatically by way of access to data in another location. Thus, it may be that all of the information is entered manually by a data entry clerk or the like. Likewise, it may be that the VIN of the vehicle 14 is scanned by way of a hand-held VIN scanner or the like and based thereon most if not all of the other information in the record 24 is populated. As should be understood, in the latter case in particular, the VIN may be employed to obtain the vehicle identification data, perhaps from an appropriate state, federal, or national database, which in turn may be employed to obtain the owner identification data, again perhaps from an appropriate state, federal, or national database, and also to obtain the lien and/or lease holder identification data, once again perhaps from an appropriate state, federal, or national database.

It is expected that a good number of vehicles 14 as impounded will eventually be claimed by the respective owners 16 thereof, typically upon presenting proof of ownership and payment of fines, penalties, and/or other costs associated with impoundment. That said, it follows that the remainder of the vehicles 14 as impounded will not be claimed by the respective owners 16 thereof, at least within a reasonable time after impoundment. Accordingly, municipalities 10 are typically empowered to dispose of such non-claimed impounded vehicles 14 by auctioning same, as was set forth above.

In various embodiments of the present invention, then, the system 22 accommodates and effectuates the process 18 by which each non-claimed impounded vehicle 14 is to be auctioned. In particular, and turning now to FIG. 5, it is seen that after a period of time after impoundment has elapsed, an impounded vehicle 14 may be 'marked' as being available for auctioning (303, FIG. 3). Such marking may occur based on any appropriate criteria, and may occur manually or automatically as may be appropriate. For example, it may be that such marking occurs upon the passage of a number of days, perhaps 21 or 30, after impoundment, and may be performed automatically, perhaps as a daily process of the system 22. Alternately, it may be that such marking occurs upon a determination that the likelihood of claiming has decreased below a set level, and is performed manually and even subjectively. As should be appreciated, then, the criteria and process for marking may be any appropriate criteria and process without departing from the spirit and scope of the present invention.

Figure 5:
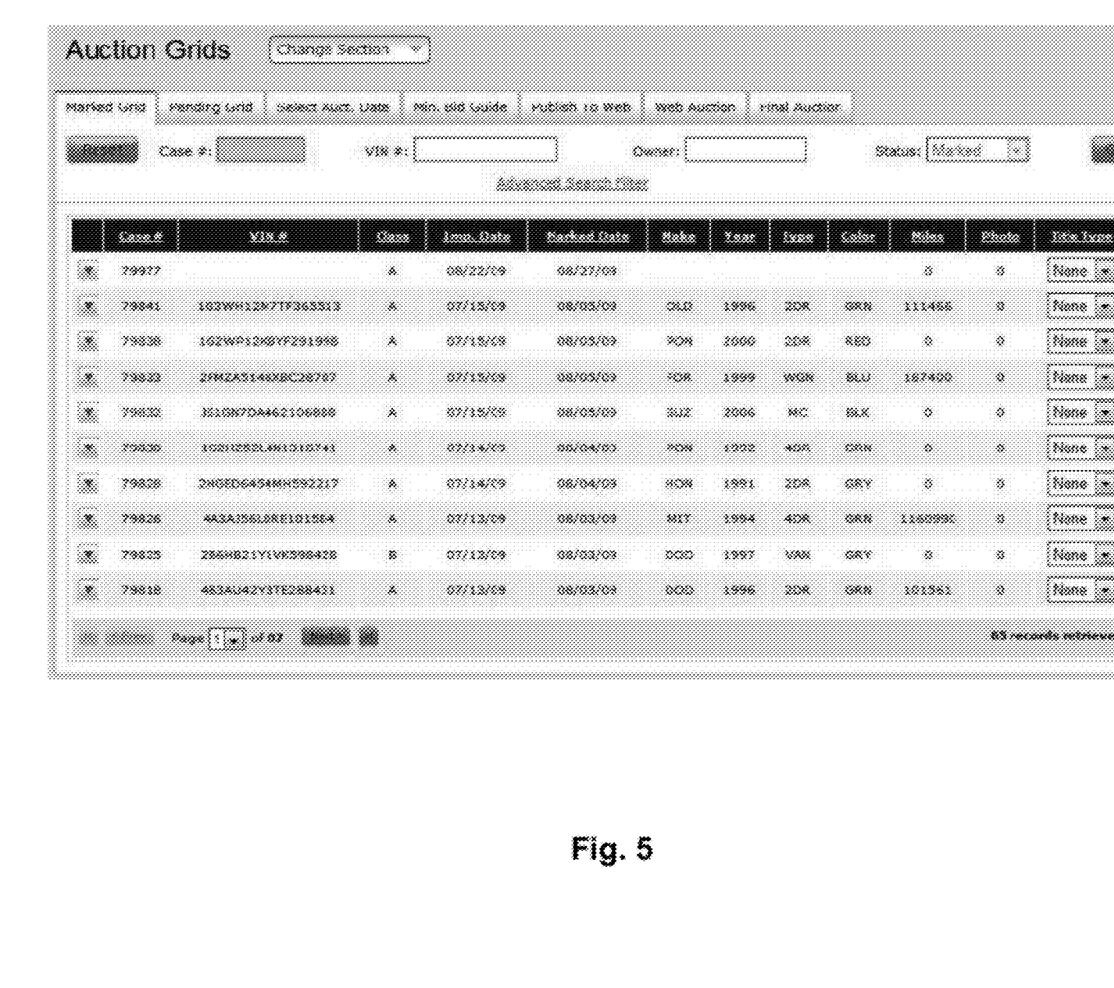

As seen in FIG. 5, the system 22 may be employed to display a table, chart, or 'grid' of all vehicles 14 that have been marked for auctioning as part of the auctioning process 18. As shown, each marked vehicle 14 as displayed in such 'marked grid' may be accompanied by various related information, such as for example the VIN, the impoundment date, the make, model, and year, the mileage, and the like. Notably, the marked grid in FIG. 5 includes a column entitled 'Title Type', and the row for each marked vehicle 14 as appearing in the marked grid includes a cell in such 'Title Type' column. Thus, by way of such cell, the marked vehicle 14 may be selected for titling as part of the auction process 18 (305, FIG. 3). In particular, by appropriately selecting such cell, the auction process 18 effectuates a course of action by which application is made for title for the selected vehicle 14 in the name of the municipality 10 or the like.

Such a course of action for applying for title may be any appropriate course of action without departing from the spirit and scope of the present innovation. In one embodiment, the course of action is that a title application form is automatically printed out for execution and delivery to an appropriate titling agency, where the form is filled out based on information available from the corresponding record 24 for the selected vehicle 14 In another embodiment, the course of action is that a list of selected vehicles 14 is compiled, and an agent or clerk then manually fills out a title application form for each selected vehicle 14 on the list and then executes and delivers the forms to the appropriate titling agency.

Figure 6:
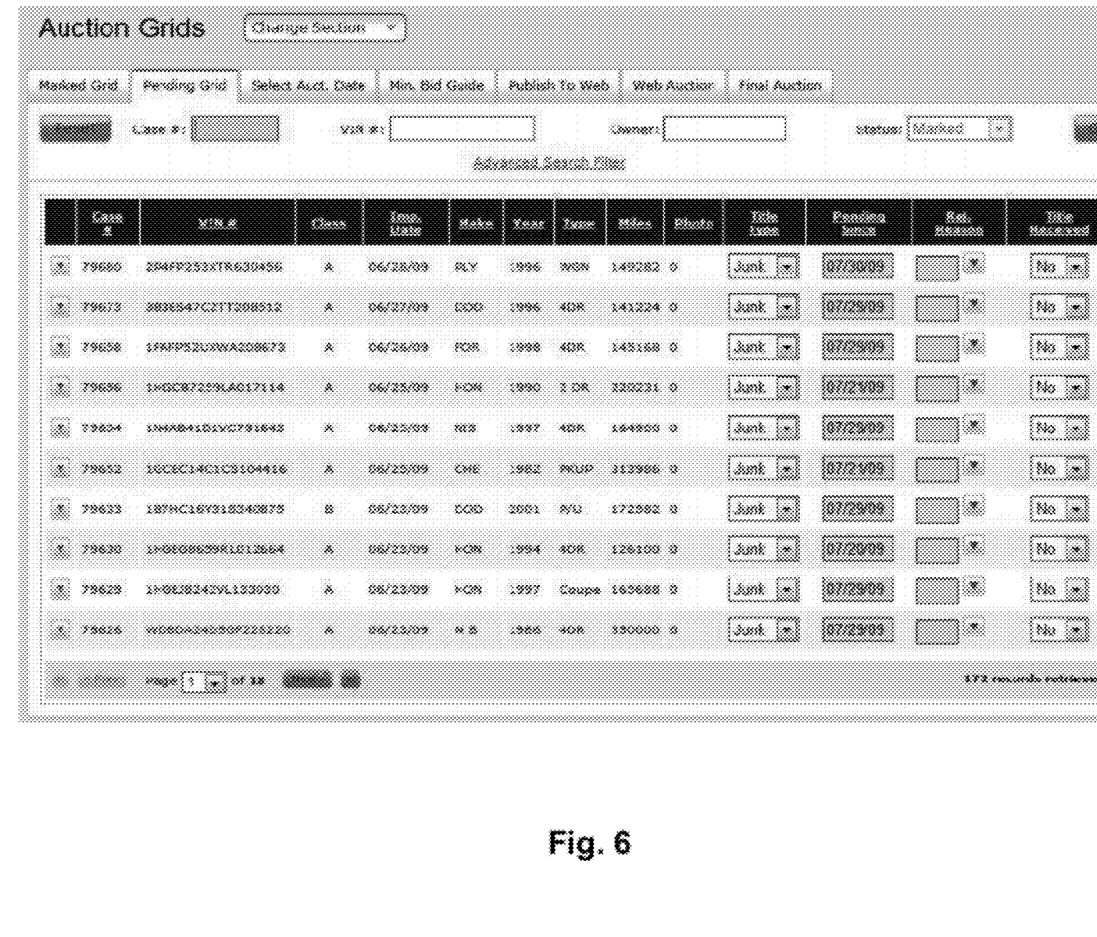

In various embodiments, selecting a marked vehicle 14 for titling by way of the marked grid of FIG. 5 causes the system 22 to move the selected vehicle 14 from such marked grid of FIG. 5 to a 'pending' grid as is seen in FIG. 6. As shown, the pending grid of the system 22 is a chart or table of all vehicles 14 that have been selected for titling as part of the auctioning process 18, where such titling is pending. As shown, each selected and pending vehicle 14 as displayed in such 'pending grid' may be accompanied by various related information, such as for example the VIN, the impoundment date, the make, model, and year, the mileage, and the like. The related information may also include titling information, such as the type of title requested, a 'pending since' date since titling has been pending, and a rejection reason if titling has been rejected.

Notably, the pending grid in FIG. 6 includes a column entitled 'Title Received', and the row for each pending vehicle 14 as appearing in the pending grid includes a cell in such 'Title Received' column. Thus, by way of such cell, the pending vehicle 14 may be marked as titled as part of the auction process 18 (307, FIG. 3). In particular, by appropriately selecting such cell, the auction process 18 is informed that the application for title for the pending vehicle 14 has been approved and received, meaning that title for the vehicle 14 is now in the name of the municipality 10 or the like, and the vehicle 14 is now a titled vehicle 14.

As presently envisioned and as shown in FIG. 6, the cell in the 'Title Received' column for each pending vehicle 14 is manually modified, perhaps by a clerk or agent or the like. Nevertheless, such cell can additionally or alternatively be automatically modified in the course of the auctioning process 18, perhaps by the system 22 itself or by another system. For example, if title is automatically applied for and then automatically received by way of an appropriate service, the automatic reception of the title may include or may trigger an action whereby the aforementioned cell is automatically modified to reflect that the title for the pending vehicle has in fact been received.

Figure 7:
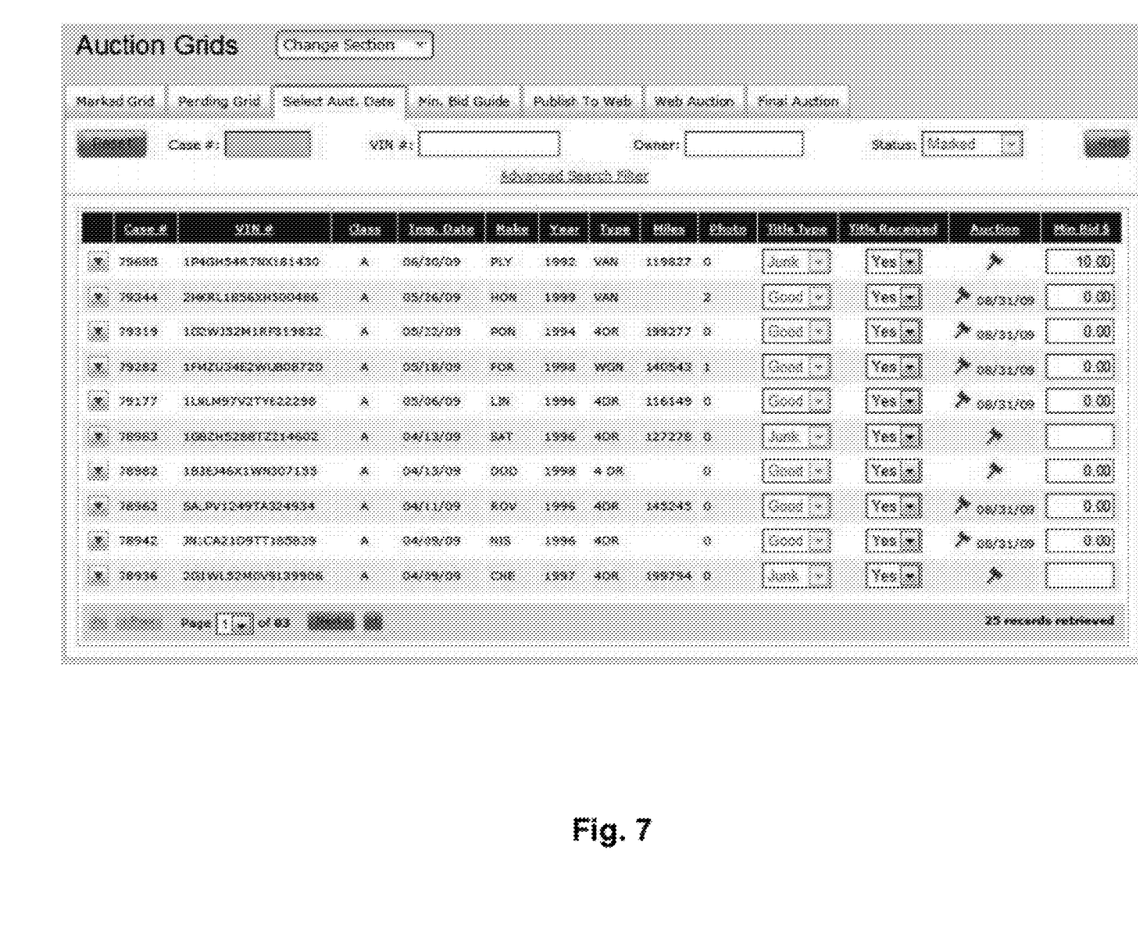

In various embodiments, noting that a pending vehicle 14 has been titled by way of the pending grid of FIG. 6 causes the system 22 to move the now-titled vehicle 14 from such pending grid of FIG. 6 to a 'select auction date' grid as is seen in FIG. 7. As shown, the select auction date grid of the system 22 is a chart or table of all vehicles 14 that have been titled as part of the auctioning process 18, where such vehicles 14 are now legally possessed by the municipality 10 and thus able to be auctioned by or on behalf of such municipality 10. As shown, and similar to before, each titled vehicle 14 as displayed in such 'select auction date grid' may be accompanied by various related information, such as for example the VIN, the impoundment date, the make, model, and year, the mileage, and the like. The related information may also include titling information, such as the type of title received and a notation that the title has in fact been received.

Notably, the select auction date grid in FIG. 7 includes a column entitled 'Auction', and the row for each titled vehicle 14 as appearing in the select auction date grid includes a cell in such 'Auction' column. Thus, by way of such cell, the titled vehicle 14 may be assigned to an upcoming auction scheduled for a particular date as part of the auction process 18 (309, FIG. 3). In particular, it may be that scheduled auction dates are already noted to the system 22, perhaps by way of an appropriate service, and in such case the system 22 only allows the titled vehicle 22 to be assigned to a date for which an upcoming auction is already scheduled.

The select auction date grid of FIG. 7 also includes a column entitled 'Min. Bid', and the row for each titled vehicle 14 as appearing in the select auction date grid includes a cell in such 'Min. Bid' column. Thus, by way of such cell, the titled vehicle 14 may be manually assigned a minimum bid value in connection with the auction thereof. Note however, that such manual assignment of a minimum bid value for the titled vehicle 14 is envisioned to be optional and to be used in only limited circumstances. Instead, in various embodiments of the present innovation and as will be set forth below in more detail, a minimum bid value is automatically obtained for the titled vehicle 14.

Figure 8:
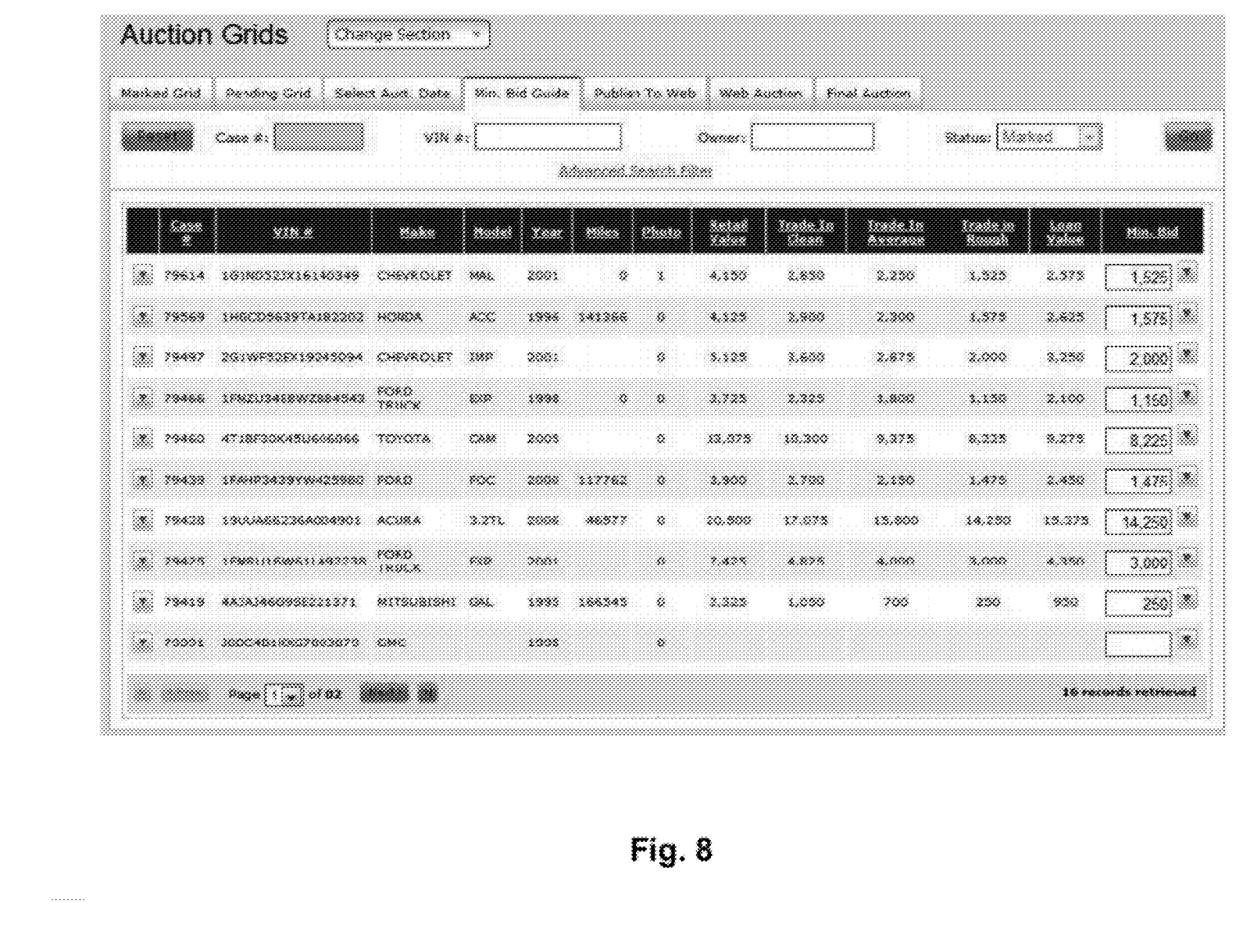

In particular, in various embodiments, assigning an upcoming auction date to a titled vehicle 14 by way of the select auction date grid of FIG. 7 causes the system 22 to move the now-scheduled vehicle 14 from such select auction date grid of FIG. 7 to a 'minimum bid guide' grid as is seen in FIG. 8. As shown, the minimum bid guide grid of the system 22 is a chart or table of all now-scheduled vehicles 14 that have been assigned an upcoming auction date as part of the auctioning process 18. As shown, and similar to before, each scheduled vehicle 14 as displayed in such 'select auction date grid' may be accompanied by various related information, such as for example the YIN, the impoundment date, the make, model, and year, the mileage, and the like. In addition, each scheduled vehicle 14 is also accompanied by estimated vehicle values, including a retail value, clean, average, and rough trade-in values, and a loan value such as would be used when employing the scheduled vehicle as collateral.

In various embodiments of the present innovation, the aforementioned vehicle values are automatically obtained from a vehicle valuation service 26 (FIG. 3), such as for example a service operated by or on behalf of the Kelly Blue Book valuation firm, the NADA valuation firm, or the like. Thus, based on information in the record 24 for the scheduled vehicle 14, the system 22 contacts the service 26 and obtains the corresponding vehicle values therefrom and displays the values in the minimum bid guide grid and/or places such values in the record 24 for the scheduled vehicle 14.

As shown, the minimum bid guide grid in FIG. 8 includes a column entitled 'Min. Bid', in a manner similar to the select auction date grid of FIG. 7, and the row for each scheduled vehicle 14 as appearing in the minimum bid guide grid includes a cell in such 'Min. Bid' column. Thus, by way of such cell, the scheduled vehicle 14 may be manually assigned a minimum bid value in connection with the auction thereof (311, FIG. 3). Here, however, the manual assignment of the minimum bid value is presumably based on a review of the various displayed values obtained for the scheduled vehicle 14 from the vehicle value service 26. In fact, in various embodiments, the minimum bid value set forth in the cell for the scheduled vehicle in the 'Min. Bid' column is pre-populated based on the obtained values from the service 26. Thus, the pre-populated minimum bid value can be accepted or can be manually altered to another value. Note here, that the pre-populated minimum bid value can be calculated by the system 22 in any appropriate manner without departing from the spirit and scope of the present innovation. For example, it may be that the pre-populated value is the lowest of the obtained values, or an average thereof, or the lowest of the obtained values plus a predetermined fixed amount, among other things.

Thus far in connection with the system 22, a vehicle 14 impounded by the municipality 10 has been marked as available for auctioning and then selected for titling (FIG. 5), noted as being titled (FIG. 6), assigned an auction date (FIG. 7), and assigned a minimum bid value (FIG. 8). Accordingly, the vehicle 14 is now ready for auctioning. Note, however, that other actions may be taken with regard to the vehicle 14 prior to auctioning, and that at least some of such other actions may be required to be taken prior to auctioning. For example, it may be that the vehicle 14 is to be advertised as being available at auction. As should be appreciated, such advertising may be in a local printed news journal, may be in an on-line news source, or the like. Notably, the system 22 may be employed to provide a listing of vehicles 14 to be auctioned on a particular date or a set of particular dates, where the listing is the basis for an appropriate advertisement.

The actual auction of a vehicle 14 may be any appropriate auction without departing from the spirit and scope of the present innovation. For example, the auction may be a so-called traditional in-person auction where all interested purchasers 20 are gathered at a predetermined location at which the vehicle 14 is presented and then put up for bid, or may be a so-called on-line auction where interested purchasers 20 participate electronically by way of an electronic auction site. In the latter case, it may also be that advertising of vehicles 14 as was set forth above is performed at the electronic auction site.

Figure 9:
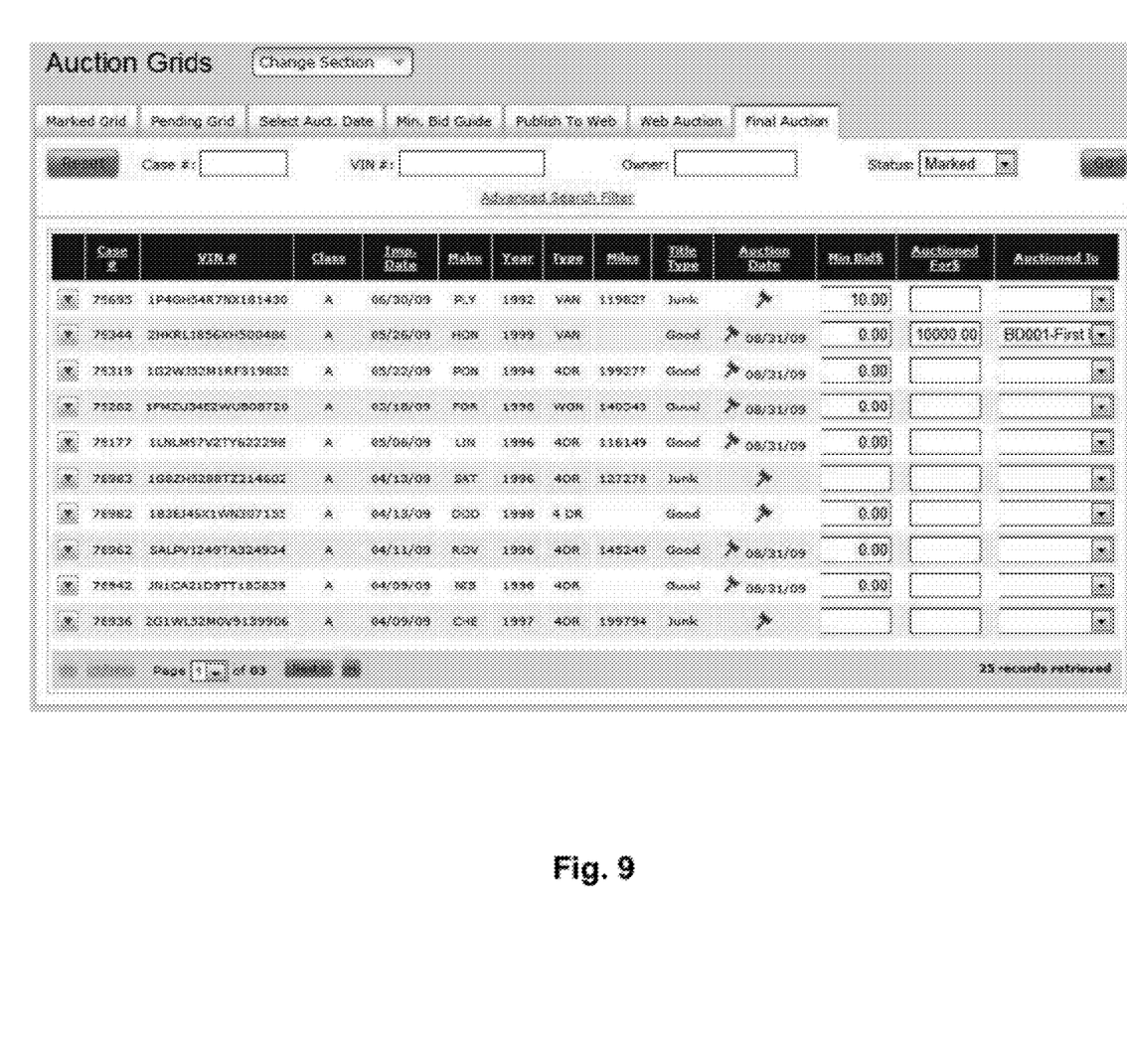

In various embodiments of the present innovation, assigning a minimum bid value to a scheduled vehicle 14 by way of the minimum bid guide grid of FIG. 8 causes the system 22 to move the now-valued vehicle 14 from such minimum bid guide grid of FIG. 8 to a 'final auction' grid as is seen in FIG. 9. Alternately, it may be that a vehicle 14 is accessible from either the minimum bid guide grid of FIG. 8 or the final auction grid of FIG. 9. As shown, the final auction grid of the system 22 is a chart or table of all vehicles 14 that are ready-for-auction. As shown, and similar to before, each scheduled vehicle 14 as displayed in such final auction grid may be accompanied by various related information, such as for example the VIN, the impoundment date, the make, model, and year, the mileage, and the like. In addition, each scheduled vehicle 14 is also accompanied by the scheduled auction date thereof and the assigned minimum bid value.

As shown, the final auction grid in FIG. 9 includes columns entitled 'Auctioned For' and 'Auctioned To', and the row for each ready-for-auction vehicle 14 as appearing in the final auction grid includes a cell in each of such 'Auctioned For' and 'Auctioned To' columns. Thus, by way of such cells, it is noted to the system 22 the value/purchase price for which the vehicle 14 has been auctioned and the purchaser 20 to whom the vehicle has been auctioned, respectively (313, FIG. 3). As may be appreciated, such information may be entered at a time after the auction or during such auction. In the latter case, it may be that auction personnel are provided with portable computing devices or the like by which the system 22 can be accessed, and employ such devices to enter the information in real-time or near-real-time. As may be appreciated, such a portable computing device can be a portable personal computer (PC), a portable data assistant (PDA), a smart phone, or the like.

As may be appreciated, a vehicle 14 can be auctioned in any of several formats without departing from the spirit and scope of the present innovation. For example the auction may be a live auction where the vehicle 14 and the purchaser 20 are present along with the auctioneer, or an on-line or 'web' auction where the purchaser 20 is not likewise present but instead is in communication via electronic access such as may be obtained by way of an interconnected network such as the Internet, among other things. Also, the vehicle 14 can be transferred in other non-auction transfer methods without departing from the spirit and scope of the present innovation. For example, the vehicle 14 can be transferred in a sale based on a fixed price. Accordingly, based on the type of transfer, the system 22 can be appropriately modified to accommodate same without departing from the spirit and scope of the present innovation.

CONCLUSION

The software programming and hardware architecture believed necessary to effectuate the processes performed in connection with the various embodiments of the present innovation are relatively straight-forward and should be apparent to the relevant computing public. Accordingly, such programming and architecture are not attached hereto. Any particular programming and architecture, then, may be employed to effectuate the various embodiments of the present innovation without departing from the spirit and scope thereof.

In the present innovation, a method and mechanism are provided by which an overall impounding and auctioning enterprise can be operated. In particular, a computerized vehicle impound and auction system 22 is provided to effectively manage impoundment and auctioning of vehicles 14 for a municipality 10. The system 22 can track and control each impounded vehicle 14 in the possession of the municipality 10, from impoundment until disposition, be it by way of reclamation, auctioning, or the like. The system 22 guides each non-claimed vehicle 14 through the auction process, and provides information on each impounded vehicle to qualified individuals.

It should be appreciated that changes could be made to the embodiments described above without departing from the innovative concepts thereof. Notably, although the present innovation is set forth primarily in terms of a municipality 10 auctioning impounded vehicles 14, the system 22 may also be employed to dispose of other objects impounded by a municipality 10, such as for example houses and/or other real estate and merchandise, and also other objects otherwise possessed by a municipality 10, such as for example surplus inventory, all in a generally similar manner albeit with appropriate modifications as necessary, while still being within the spirit and scope of the present innovation. It should be understood, therefore, that this innovation is not limited to the particular embodiments disclosed, but it is intended to cover modifications within the spirit and scope of the present innovation as defined by the appended claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A computer hardware system including a processor and memory, the system configured to manage vehicles impounded at a facility on behalf of a municipality, the system comprising modules instantiated in the memory by the processor, the modules comprising:
- a marked grid module, configured to display each of a plurality of marked impounded vehicles to system users in a marked grid, the marked grid module being configured to facilitate a selection of at least one marked vehicle for titling, such that upon the selection, effectuating an application for title for the at least one selected marked vehicle in a name of the municipality;
- a pending grid module, configured to display all selected marked vehicles for titling to the system users in a pending grid, the pending grid indicating that the at least one pending marked vehicle as being titled when the application for title for the at least one pending marked vehicle has been approved and received;
- a select auction date grid module, configured to display each titled marked vehicle to the system users in a select auction date grid, the select auction date grid module configured to facilitate a choice of an upcoming scheduled auction date for the at least one titled marked vehicle;
- a minimum bid guide grid module, configured to display all scheduled titled vehicles to the system users in a minimum bid guide grid, along with estimated vehicle values for the scheduled titled vehicles as obtained by the minimum bid guide grid module from a vehicle valuation service based on information available from a record for each of the all scheduled vehicles, the minimum bid guide grid module configured to facilitate assigning a minimum bid value to the at least one scheduled titled vehicle in connection with a corresponding one of the estimated vehicle values; and
- a final auction grid module, configured to display each valued vehicle to the system users in a final auction grid, the final auction grid module configured to enter a purchase price for which the at least one valued titled vehicle has been auctioned and a purchaser to whom the at least one valued titled vehicle has been auctioned.

2. The system according to claim 1, further comprising a marking module that marks each impounded vehicle after a period of time after impoundment of the vehicle has elapsed as a marked vehicle being available for auctioning.

3. The system according to claim 1, wherein each compounded vehicle is represented as a record in a system database, the record for the vehicle including all pertinent information relating thereto and being updated by the modules, the record being created by electronically scanning a vehicle identification number (VIN) located on the vehicle and employing the scanned VIN to obtain corresponding vehicle identification data from a VIN database.

4. The system according to claim 1, wherein the marked grid module, upon receiving a selection of at least one marked vehicle, automatically creating a title application form based on information available from the record for the at least one selected marked vehicle.

5. The system according to claim 1, wherein the marked grid module upon facilitating the selection of the at least one marked vehicle automatically moves the at least one selected marked vehicle from the marked grid to the pending grid.

6. The system according to claim 1, wherein the pending grid module, upon being informed that the at least one pending marked vehicle has been titled, automatically moves the at least one titled marked vehicle from the pending grid to the select auction date grid.

7. The system according to claim 1, wherein the select auction date grid module, upon being informed that the at least one titled vehicle has been scheduled for an auction date, automatically moves the at least one scheduled titled vehicle from the select auction date grid to the minimum bid guide grid.

8. The system according to claim 1, wherein the estimated vehicle values include at least one of a retail value, clean, average, and rough trade-in values, and a loan value such as used when employing the scheduled vehicle as collateral.

9. The system according to claim 1, wherein the minimum bid guide grid module pre-populates the minimum bid value for the at least one scheduled titled vehicle based on the obtained estimated vehicle values.

10. The system according to claim 1, wherein the minimum bid guide grid module, upon being informed that the at least one scheduled titled vehicle has been assigned a minimum bid value, automatically moves the valued vehicle from the minimum bid guide grid to the final auction grid.

11. The system according to claim 1, wherein any of the selection for titling, the upcoming scheduled auction date, the minimum bid value, a purchase price and a purchaser are provided by a user input.

12. A computer program product wherein computer instructions, when processed by a computer, adapt the operation of the computer to provide a method to operate a vehicle impounding facility operated on behalf of a municipality, the method comprising:
- displaying each of a plurality of marked impounded vehicles to system users in a marked grid, and facilitating a selection of marked vehicle for titling, such that upon the selection, effectuating an application for title for the at least one selected marked vehicle in a name of the municipality;
- displaying all selected marked vehicles as pending for titling to the system users in a pending grid, and indicating that the at least one pending marked vehicle as being titled when the application for title for the at least one pending marked vehicle has been approved and received;
- displaying each titled marked vehicle to the system users in a select auction date grid, and facilitating a choice of an upcoming scheduled auction date for the at least one titled marked vehicle;
- displaying all scheduled titled vehicles system users in a minimum bid guide grid, along with estimated vehicle values for the scheduled titled vehicles as obtained from a vehicle valuation service based on information available from a record for each of the all scheduled vehicles, and facilitating an assignment of a minimum bid value to the at least one scheduled titled vehicle in connection with a corresponding one of the estimated vehicle values; and
- displaying each valued vehicle to the system users in a final auction grid, and receiving an entry of a purchase price for which the at least one valued titled vehicle has been auctioned and a purchaser to whom the at least one valued titled vehicle has been auctioned.

13. The computer program product according to claim 12, further comprising marking each impounded vehicle after a period of time after impoundment of the vehicle has elapsed as a marked vehicle being available for auctioning.

14. The computer program product according to claim 12, wherein each compounded vehicle is represented as a record in a system database, the record for the vehicle including all pertinent information relating thereto, the method comprising creating the record by electronically scanning a vehicle identification number (VIN) located on the vehicle and employing the scanned VIN to obtain corresponding vehicle identification data from a VIN database.

15. The computer program product according to claim 12, further comprising, upon receiving a selection of at least one marked vehicle, automatically creating a title application form based on information available from the at least one selected marked vehicle.

16. The computer program product according to claim 12, further comprising, upon facilitating the selection of the at least one marked vehicle automatically moving the at least one selected marked vehicle from the marked grid to the pending grid.

17. The computer program product according to claim 12, further comprising, upon being informed that the at least one pending marked vehicle has been titled, automatically moving the at least one titled marked vehicle from the pending grid to the select auction date grid.

18. The computer program product according to claim 12, further comprising, upon being informed that the at least one titled vehicle has been scheduled for an auction date, automatically moving the at least one scheduled titled vehicle from the select auction date grid to the minimum bid guide grid.

19. The computer program product according to claim 12, wherein the estimated vehicle values include at least one of a retail value, clean, average, and rough trade-in values, and a loan value such as used when employing the scheduled vehicle as collateral.

20. The computer program product according to claim 12, further comprising pre-populating the minimum bid value for the at least one scheduled titled vehicle based on the obtained estimated vehicle values.

21. The computer program product according to claim 12, further comprising, upon being informed that the at least one scheduled has been assigned a minimum bid value, automatically moving the valued vehicle from the minimum bid guide grid to the final auction grid.

22. A method performed by a computing device, comprising:
- displaying each of a plurality of marked impounded vehicles to system users in a marked grid, and facilitating a selection of marked vehicle for titling, such that upon the selection, effectuating an application for title for the at least one selected marked vehicle in a name of the municipality;
- displaying all selected marked vehicles as pending for titling to the system users in a pending grid, and indicating that the at least one pending marked vehicle as being titled when the application for title for the at least one pending marked vehicle has been approved and received;
- displaying each titled marked vehicle to the system users in a select auction date grid, and facilitating a choice of an upcoming scheduled auction date for the at least one titled marked vehicle;
- displaying all scheduled titled vehicles system users in a minimum bid guide grid, along with estimated vehicle values for the scheduled titled vehicles as obtained from a vehicle valuation service based on information available from a record for each of the all scheduled vehicles, and facilitating an assignment of a minimum bid value to the at least one scheduled titled vehicle in connection with a corresponding one of the estimated vehicle values; and
- displaying each valued vehicle to the system users in a final auction grid, and receiving an entry of a purchase price for which the at least one valued titled vehicle has been auctioned and a purchaser to whom the at least one valued titled vehicle has been auctioned.

\* \* \* \* \*